(12) United States Patent
Kaimer et al.

(10) Patent No.: US 8,930,096 B2
(45) Date of Patent: Jan. 6, 2015

(54) METHOD AND APPARATUS FOR LUBRICATING A TRANSMISSION OF A MOTOR VEHICLE

(75) Inventors: Simon Kaimer, Fernitz (AT); Martin Parigger, Eggersdorf (AT); Franz Gratzer, Stallhofen (AT)

(73) Assignee: Magna Powertrain AG & Co KG, Lannach (AT)

( * ) Notice: Subject to any disclaimer, the term of this patent is extended or adjusted under 35 U.S.C. 154(b) by 585 days.

(21) Appl. No.: 12/999,757

(22) PCT Filed: Jun. 23, 2009

(86) PCT No.: PCT/EP2009/004528
§ 371 (c)(1),
(2), (4) Date: Feb. 25, 2011

(87) PCT Pub. No.: WO2009/156127
PCT Pub. Date: Dec. 30, 2009

(65) Prior Publication Data
US 2011/0135500 A1   Jun. 9, 2011

(30) Foreign Application Priority Data
Jun. 24, 2008   (DE) .......................... 10 2008 029 880

(51) Int. Cl.
| | |
|---|---|
| G06F 17/00 | (2006.01) |
| G06G 7/70 | (2006.01) |
| F04B 49/00 | (2006.01) |
| F04B 49/06 | (2006.01) |
| F16N 7/38 | (2006.01) |
| F04B 49/02 | (2006.01) |
| F16H 57/04 | (2010.01) |

(52) U.S. Cl.
CPC . *F16N 7/38* (2013.01); *F04B 49/02* (2013.01); *F16H 57/0483* (2013.01); *F16H 57/0435* (2013.01); *F16H 57/0436* (2013.01); *F16N 2210/12* (2013.01); *F16N 2270/72* (2013.01)
USPC .................. 701/51; 701/101; 417/1; 417/44.1

(58) Field of Classification Search
CPC ......... B60K 6/445; B60K 1/02; B60W 10/06; F16H 57/0441
USPC ........ 701/51, 101, 103; 417/104–105, 1, 44.1
See application file for complete search history.

(56) References Cited

U.S. PATENT DOCUMENTS

| | | | |
|---|---|---|---|
| 4,538,644 A | | 9/1985 | Knutson et al. |
| 5,148,903 A | * | 9/1992 | Kobayashi et al. ........ 192/85.25 |
| 5,217,085 A | | 6/1993 | Barrie et al. |
| 5,640,322 A | | 6/1997 | McCafferty et al. |
| 6,390,947 B1 | | 5/2002 | Aoki et al. |
| 6,647,326 B2 | * | 11/2003 | Nakamori et al. ............... 701/22 |
| 8,774,972 B2 | * | 7/2014 | Rusnak et al. ................ 700/282 |

(Continued)

FOREIGN PATENT DOCUMENTS

| | | |
|---|---|---|
| CN | 2639666 Y | 8/2004 |
| DE | 38 17 290 | 11/1989 |

(Continued)

*Primary Examiner* — Helal A Algahaim
*Assistant Examiner* — Nga X Nguyen
(74) *Attorney, Agent, or Firm* — Dickinson Wright PLLC

(57) ABSTRACT

The invention relates to a method for lubricating a transmission of a motor vehicle, particularly a power divider, wherein the oil is conveyed by an oil pump from an oil sump to components of the transmission. The amount of oil conveyed is set as a function of the predetermined parameters. The conveyed amount of oil is controlled in that the oil pump is operated intermittently, e.g. is switched on and off repeatedly. The invention further describes a device for carrying out the method.

19 Claims, 2 Drawing Sheets

(56) References Cited

U.S. PATENT DOCUMENTS

| | | |
|---|---|---|
| 2004/0063533 A1 | 4/2004 | Silveri et al. |
| 2006/0223670 A1 | 10/2006 | Nishikawa et al. |
| 2007/0175720 A1 | 8/2007 | Yoshida et al. |
| 2009/0232673 A1 | 9/2009 | Reisch et al. |
| 2009/0259381 A1* | 10/2009 | Wilson et al. ............... 701/101 |

FOREIGN PATENT DOCUMENTS

| | | |
|---|---|---|
| DE | 199 50 422 | 4/2001 |
| DE | 100 28 074 | 5/2001 |
| DE | 101 48 424 | 7/2002 |
| DE | 10 2004 058 261 | 6/2006 |
| DE | 10 2005 013 137 | 9/2006 |
| DE | 10 2005 013 657 | 9/2006 |
| DE | 10 2005 028 848 | 1/2007 |
| DE | 10 2006 026 980 | 12/2007 |
| EP | 0 352 397 | 1/1990 |
| EP | 1 260 739 | 11/2002 |
| JP | 03-113158 | 5/1991 |
| JP | 04-285358 | 10/1992 |

* cited by examiner

METHOD AND APPARATUS FOR LUBRICATING A TRANSMISSION OF A MOTOR VEHICLE

BACKGROUND OF THE INVENTION

1. Technical Field

The present invention relates to a system and method for lubricating a transmission of a motor vehicle.

2. Related Art

In so-called lubrication systems adequate to the demand, the quantity of the conveyed oil is, for example, set in dependence on the load of the transmission, with a larger quantity of oil usually being set at a higher load. To be able to realize this quantity setting, an electrically controlled oil pump can, for example, be used.

It is problematic with such a lubrication adequate to the demand that, on the one hand, the efficiency of an electrically operated oil pump is relatively small at low speeds and, on the other hand, when the motor is switched on, no reliable start-up of the electric motor can be ensured due to the start-up torque to be overcome if only a relatively small quantity of oil should be conveyed.

SUMMARY OF THE INVENTION

The present invention provides a system and method for lubricating a transmission of a motor vehicle, in particular a transfer case, in which oil is conveyed by an oil pump from an oil sump to components of the transmission, wherein the quantity of the conveyed oil is set in dependence on preset parameters. The invention is further directed to an apparatus for lubricating a transmission of a motor vehicle, in particular a transfer case, having an oil pump for conveying oil from an oil sump to components of the transmission and having a control unit for the oil pump by which the quantity of the oil conveyed by the oil pump is adjustable in dependence on preset parameters.

It is an object of the present invention to configure a method and an apparatus of the initially named kind such that a reliable lubrication adequate to the demand is ensured under all operating conditions.

Starting from a method of the initially named kind, this object is satisfied in accordance with the invention in that a control of the conveyed quantity of oil takes place in that the oil pump is operated intermittently, i.e. is repeatedly switched on and off. An apparatus in accordance with the invention is characterized in that the control unit is configured to control the conveyed amount of the oil pump by an intermittent operation of the pump, i.e. by a repeated switching on and off of the oil pump.

In accordance with the invention, a preset desired quantity of lubrication oil/coolant oil is achieved by an intermittent operation of the pump. Since the pump is operated intermittently, i.e. is repeatedly switched on and off, the oil pump can also be operated with an input voltage or with an input current which ensures a reliable start-up of the motor even with small conveyed quantities of oil. Due to the intermittent operation, the conveyed quantity of oil in this respect on average corresponds to the wanted desired quantity of oil so that the desired lubrication adequate to the demand is achieved. At the same time, it is achieved by the intermittent operation that the oil pump is always operated in a range in which the efficiency of the oil pump lies above a preset minimum efficiency. The release clearance in a clutch of a transfer case can, for example, be minimized by the lubrication in accordance with the invention so that higher dynamics are achieved. A smaller basic torque can optionally also be achieved with a release clearance unchanged with respect to a known lubrication if this should be preferred.

In accordance with a preferred embodiment of the invention, the respective switch-on duration and/or the respective switch-off duration of the oil pump during the intermittent operation lies approximately between 1 to 100 seconds, preferably approximately between 5 and 50 seconds, in particular in the range of approximately 10 seconds. In accordance with the invention, a conveying of oil thus takes place by the oil pump during the switch-on intervals, whereas the conveying of oil is interrupted or is at least considerably reduced during the switch-off intervals of the intermittent operation since the oil pump is stationary or only runs after briefly during the switch-off intervals. The conveying performance of the oil pump during a switch-on interval thus considerably differs from the conveying performance during a switch-off interval. The intermitting operation can thus not be confused with a pulse-width modulation of the control voltage whose frequency is higher by orders of magnitude than the frequency of the intermitting operation)e.g. 15 kHz with respect to 0.1 Hz). The input voltage or the input current of the oil pump can rather be pulse-width modulated in addition to the intermittent operation as is usual in the control of electric motors. However, no intermittent operation in the sense of the present invention is achieved by this pulse-width modulation since the conveying performance of the oil pump during the brief modulation interval is practically equal.

In accordance with an advantageous embodiment of the invention, the control of the conveyed quantity of oil takes place in defined control intervals which follow one another, with the oil pump being intermittently operated within the control intervals. A wanted desired quantity of oil can be preset in dependence on the preset parameters in each control interval and is directly and reliably achieved within the control interval by the intermittent operation of the pump. The relevant parameters can in this respect substantially be determined in an on-going manner, for example substantially continuously or sequentially for each control interval.

In accordance with a further advantageous embodiment of the invention, the oil pump is controlled on the switching on such that a start-up torque required for the reliable start-up of the oil pump is exceeded. The oil pump is advantageously controlled during its operation so that an operating torque required for the reliable further running of the oil pump is exceeded.

The start-up torque and the operating torque can generally be equal. Usually, however, the required start-up torque is larger than the required operating torque so that, when the oil pump is switched on, for example, the switch-on duration is cut with respect to the switch-on duration in on-going operation and in return the then current performance of the motor is increased in order reliably to exceed the required start-up torque with the same desired conveyed quantity. On use of an electrically driven oil pump, the oil pump can, for example, be operated at a voltage which exceeds a preset minimum voltage. A current control is generally also possible, with the corresponding voltage values or current values corresponding to a preset desired conveyed quantity being able to be selected larger in the start-up case of the oil pump than in the operating case with an already switched on oil pump both in the voltage control case and in the current control case.

The higher the applied voltage or the applied current is selected, the shorter the respective switch-on duration is selected to bring the quantity of oil conveyed in total to the desired value. It is thus achieved by the intermittent control that the quantity of oil conveyed on average is equal to the conveyed quantity which would be set in a continuous operation at a smaller operating voltage or at a smaller operating current.

In accordance with a further preferred embodiment of the invention, the intermittent operation of the oil pump takes place in a first operating state in which the desired quantity of oil to be conveyed is below a predefined first minimum value. This first operating state can in this respect also be the only operating state so that the oil pump is operated in intermittent operation in all cases.

In accordance with an advantageous embodiment of the invention, it is, however, also possible that a continuous or an intermittent operation of the oil pump takes place in a second operating state in which the desired quantity of oil to be conveyed exceeds a predefined second minimum value,. If the desired quantity of oil to be conveyed is so high that a reliable start-up or continued running of the oil pump is also ensured without intermittent operation, a continuous or an intermittent operation of the oil pump can thus take place in this second operating state. Only if the predefined second minimum value is not reached is a switch again made in this case in accordance with the invention to the intermittent operation of the oil pump. In this respect, the first and the second minimum values can be equal or different. In the latter case, a hysteresis can be produced for the switching over of the control by a selection of suitable minimum values, with the second minimum value in particular being larger than the first minimum value.

In a third operating state in which the desired quantity of oil to be conveyed exceeds a predefined peak value, a continuous operation of the oil pump at substantially maximum performance advantageously takes place. Such a continuous operation usually takes place at maximum performance only over a predefined maximum time period in which a maximum conveying of a quantity of oil is present. Permanent operation in this range of maximum performance is usually not possible since the motors used are usually not adapted for permanent operation at maximum performance.

In accordance with a further advantageous embodiment of the invention, the control of the quantity of oil conveyed takes place in dependence on the load. The oil sump temperature, the speed of a transmission shaft and/or the power loss of a multidisk clutch provided within the transmission, in particular the liner temperature of the multidisk clutch, can be used as parameters for the intermittent control, for example. The parameters can, for example, be determined via corresponding sensors or in another manner, e.g. calculated. The then current power loss of the multidisk clutch can, for example, be calculated via a present temperature model.

No regulation of the pump speed advantageously takes place in accordance with the invention, for which purpose a complex determination of the actual pump speed would be necessary, but rather a reliable control is provided by the invention which also allows a reliable start-up and further running of the oil pump at low desired quantities of oil and simultaneously ensures a high efficiency of the oil pump.

Further advantageous embodiments of the invention are set forth in the dependent claims.

BRIEF DESCRIPTION OF THE DRAWINGS

The invention will be explained in more detail in the following with reference to an embodiment and to the drawing; there are shown in this.

DETAILED DESCRIPTION OF THE ENABLING EMBODIMENTS

Figure 1:
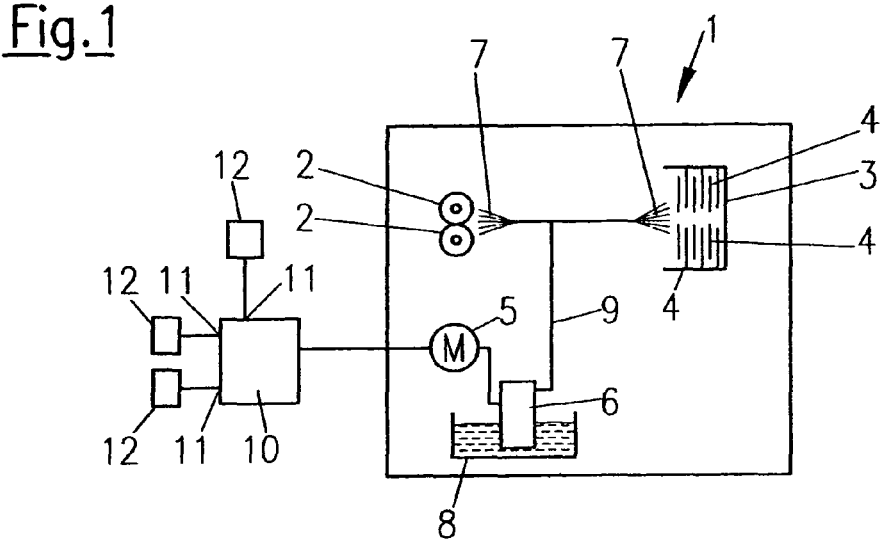
FIG. 1 a greatly simplified, schematic representation of the invention.

A transfer case 1 is shown in very simplified form in FIG. 1 which includes a plurality of gears 2 as well as a multidisk clutch 3 with disks 4. With an all-wheel drive vehicle, the drive power can, for example, be distributed between the front axle and the rear axle as required using the transfer case 1.

Furthermore an oil pump 6 is provided which is driven via an electric motor 5 and by which oil 7 can be conveyed from an oil sump 8 via a line 9 to the gears 2 and to the multidisk clutch 3. A lubrication and/or as cooling of the transmission elements in each case wetted with the oil 7 is achieved in dependence on demand by the oil 7. Generally, a plurality of lines 9 can also be provided or it is generally also possible to provide some or all of the transmission elements to be lubricated/cooled directly with the oil 7 by an injection lubrication from the soil sump 8. Instead of the electric motor 5, another suitable controllable drive unit can also be used by which the conveying performance of the oil pump 6 can be set adequate to the demand.

The electric motor 5 is connected to a control unit 10 by which a variable which influences the engine speed such as an input voltage or an input current of the electric motor 5 can be directly set. The control unit 10 can, for example, be the central engine control unit (ECU) of a motor vehicle or a separate control device. The control unit 10 furthermore has inputs 11 which are connected to sensors 12 or to other control elements via which the parameters of the transfer case 1 relevant to operation can be calculated or otherwise determined and transferred to the control unit 10. Examples for such parameters can be the oil sump temperature, the speed of a transmission shaft, the power loss of the multidisk clutch 3, the liner temperature of the multidisk clutch 3 or other suitable parameters. In particular the liner temperature of the multidisk clutch can in this respect, for example, be calculated via a preset temperature model or be otherwise measured.

A desired conveyed quantity of oil is determined from these parameters by the control unit 10 and ultimately a setting signal is determined for the electric motor 5 which ensures a conveying of the determined desired conveyed quantity of oil by the oil pump 6.

Figure 2:
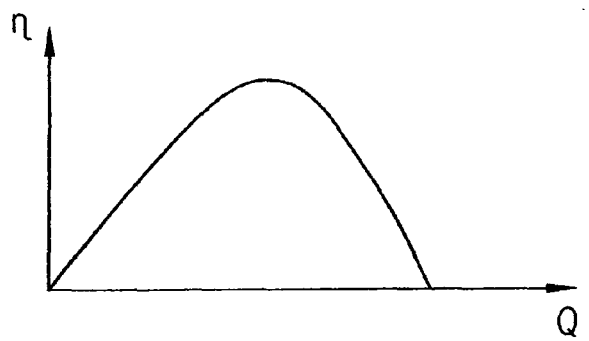
FIG. 2 the dependence between the efficiency and the coil delivery rate of an oil pump in a highly simplified graphic representation.

The efficiency η is shown schematically in FIG. 2 via the delivery rate Q of the oil pump 6. It can be seen from the curve profile shown that the efficiency is very low both at very small and at very high conveyed quantities. The operation in the most unfavorable range at high conveyed quantities can be avoided by corresponding configuration of the oil pump 6. However, the problem remains that the range of action of the oil pump 6 is insufficient at low conveyed quantities.

There is furthermore the problem that a specific minimal start-up torque has to be overcome to start up the electric motor 5 as well as the oil pump 6. If the desired oil quantity is so low that the corresponding variable delivered by the control unit 10 to the electric motor 5 does not generate this minimal start-up torque, a reliable start-up of the electric motor 5 and of the oil pump 6 is not ensured.

To solve these two problems, the oil pump 6 is operated intermittently in accordance with the invention as will be explained in more detail in the following.

Figure 3:
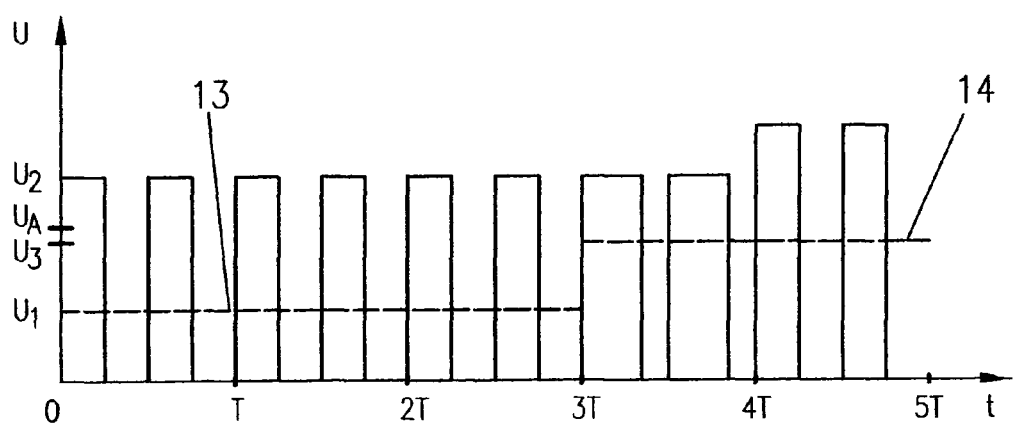
FIG. 3 a possible input voltage profile of an oil pump in a method in accordance with the invention.

FIG. 3 shows the time profile of the input voltage U of the electric motor 5 which can be generated as a variable by the control unit 10. Another variable, for example the input current of the electric motor 5, can generally also be used without the basic method described in the following generally being changed thereby.

In the diagram in accordance with FIG. 3, UA designates the start-up voltage which has to be applied to the input of the electric motor 5 in order reliably to overcome the described start-up torque of the electric motor 5 and the oil pump 6.

If now, for example, a demand for a very small desired quantity of oil, which corresponds to a voltage $U_1$ given in FIG. 3 in continuous operation, is present on the basis of the parameters delivered to the control unit 10 by the sensors 12, the constant voltage profile 13 shown by a broken line would result on the application of this voltage $U_1$, for example over the three control intervals T following one another. Since in this case, the input voltage $U_1$ is below the start-up voltage UA required for exceeding the start-up torque, no or at least no reliable conveying by the oil pump 6 would, however, take place.

In accordance with the invention, the input voltage of the electric motor 5 is therefore repeatedly switched on and off for preset time durations in the respective control intervals T following one another, i.e. from 0 to T, from T to 2T and from 2T to 3T, with simultaneously the input voltage in each case being set on the switching on to a value $U_2$ which is considerably above the start-up voltage UA, as is shown in FIG. 3. A safe start-up of the electric motor 5 and of the oil pump 6 is thus ensured on the basis of the amount of the input voltage $U_2$. At the same time, it is ensured by the intermittent operation that the quantity of oil conveyed in total over the control intervals T corresponds to the preset desired quantity of oil. For this purpose, the switching on times and switching off times of the input voltage is correlated with the amount of the voltage $U_2$ so that in each case the same quantity of oil is conveyed in each control interval T as in a continuous operation at the input voltage $U_1$.

If the desired conveyed quantity of oil increases due to the parameters determined by the sensors 12 to a value which corresponds in continuous operation of the electric motor 5 to the voltage $U_3$ shown in FIG. 3, the voltage profile 14 shown by a broken line would result from the time 3T in continuous operation. Since the input voltage $U_3$ is also still below the start-up voltage UA, a reliable start-up of the electric motor 5 and of the oil pump 6 would still also not take place at this increased oil conveying.

However, the increased quantity of conveyed oil can take place by extension of the switch-on times using the method in accordance with the invention, as is indicated in the control interval 4T-3T, or by an increase in the applied voltage value, as is indicated in the time interval 5T-4T. A combination of these two methods is also possible. In all cases, however, the voltage value applied in each case to the input of the electric motor 5 in the method in accordance with the invention is above the start-up voltage UA so that a reliable start-up of the electric motor 5 and of the oil pump 6 is ensured.

In accordance with the invention, the intermittent operation is also at least maintained during operation when the demanded desired quantity of oil would result in an input voltage at which a reliable operation of the electric motor 5 and of the oil pump 6 were no longer ensured. In this respect, a minimum voltage corresponding to a minimum torque required for the operation can either be equal to the start-up voltage UA or can also be below it.

Whereas in FIG. 3 only two respective switch-on and switch-off times are shown per control interval for reasons of clarity, it is generally possible that a plurality of such switch-on and switch-off times are present during a control interval T.

Figure 4:
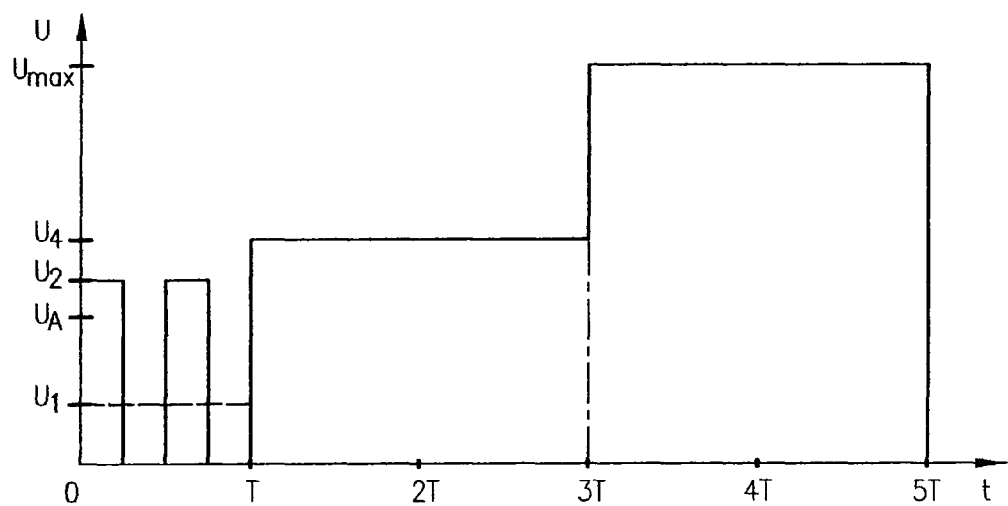
FIG. 4 a further input voltage profile in accordance with the invention.

If the desired quantity of oil is so high on the basis of the parameters determined by the sensors 12 that the input voltage $U_4$ to be applied accordingly to the electric motor 5 is above the start-up voltage $U_A$, as is indicated in FIG. 4 from the time T onward, a switch can be made in accordance with the invention from the intermittent control of the electric motor 5 to a continuous control, as is shown, for example, in FIG. 4 during the control intervals 2T-T and 3T-2T. Since a reliable operation of the electric motor 5 and of the oil pump 6 is also ensured with a continuous input voltage at the input voltage $U_4$, the intermittent operation is thus not necessarily required with a correspondingly high oil demand. The intermittent operation is, however, generally also possible with such a constellation.

If a maximum oil demand is generated on the basis of the parameters determined by the sensors 12, the electric motor 5 can be continuously operated at its maximum performance for a short time by application of a maximum voltage $U_{max}$, as is shown in FIG. 4 during the control intervals 4T-3T and 5T-4T. Since the electric motor 5 as well as the oil pump 6, however, can usually not be operated in permanent operation at their maximum performance, such a maximum operation is only possible for a specific preset time. If the demand for the maximum quantity of oil is present over a longer time period, there is a high probability that an error is present so that in this case the system is automatically deactivated or partly deactivated.

Whereas the setting of the input voltage was carried out in each case for a preset control interval T in FIGS. 3 and 4, it is generally possible also to carry out a corresponding setting continuously in time. Instead of the electrically controlled oil pump 6, any other suitable oil pump having a variably adjustable conveying performance can also be used. The invention was admittedly described with reference to a transfer case; however, it is generally usable everywhere a lubrication adequate to the demand is required, with a cooling in particular also being able to take place by the lubrication.

An oversupply by too much lubricant is prevented by the lubrication adequate to the demand so that an ideal oil supply and cooling is achieved at all operating points (wear optimization, oil service life, drag torque reduction of the clutch, etc.).

REFERENCE NUMERAL LIST 1 transfer case
2 gears
3 multidisk clutch
4 disks
5 electric motor
6 oil pump
7 oil
8 oil sump
9 line
10 control unit
11 inputs
12 sensors
13 voltage profile
14 voltage profile

The invention claimed is:

1. A system for lubricating a transmission of a motor vehicle, comprising:
   a plurality of transmission components;
   an oil pump conveying an amount of lubricating oil to said transmission components;
   a drive unit receiving an input voltage and using the input voltage to drive said oil pump, wherein the input voltage is received by said drive unit during preset durations of time and no voltage is received by said drive unit during intervals between the preset durations of time, and wherein a first group of the preset durations of time during which the input voltage is received by the drive unit are equal to one another, a second group of the preset durations of time following the first group are equal to one another, and the preset durations of time of the first group are different from the preset durations of time of the second group,
   the input voltage received by said drive unit during each preset duration of time is greater than a minimum voltage required to start said drive unit and said oil pump, and
   the amount of lubricating oil conveyed by said oil pump to said transmission components is proportional to the input voltage received by said drive unit.

2. The system of claim 1, including a control unit providing the input voltage to said drive unit by repeatedly switching the drive unit on and off.

3. The system of claim 2, wherein said control unit receives parameters relevant to operation of said transmission components and adjusts the input voltage provided to said drive unit based on the parameters.

4. The system of claim 1, wherein the amount of lubricating oil conveyed from said oil pump to said transmission components is a desired amount and is conveyed intermittently.

5. The system of claim 1, wherein a plurality of the preset durations of time during which the input voltage is received by the drive unit are equal to one another.

6. The system of claim 1, wherein the preset durations of time follow one another and repeat continuously.

7. The system of claim 1, wherein the preset durations of time together equal a total duration of time, the input voltage received by said drive unit during the total duration of time causes the amount of lubricating oil conveyed by said oil pump to equal a preset desired amount, and wherein the input voltage received by said drive unit during the total duration of time is less than the minimum voltage required to start said drive unit and said oil pump when the input voltage is received by said drive unit continuously over the total duration of time without the intervals.

8. The system of claim 1, wherein the transmission components include a plurality of gears and a clutch with discs.

9. A method for lubricating a transmission of a motor vehicle, comprising the steps of:
   providing an input voltage to a drive unit during preset durations of time and providing no voltage to the drive unit during intervals between the preset durations of time;
   driving an oil pump using the input voltage provide to the drive unit; and
   the step of driving the oil pump including conveying an amount of lubricating oil from the oil pump to transmission components, wherein the amount of lubricating oil conveyed is proportional to the input voltage provided to the drive unit during each preset duration of time, wherein the input voltage is greater than a minimum voltage required to start the drive unit and the oil pump, and wherein a first group of the preset durations of time during which the input voltage is provided to the drive unit are equal to one another, a second group of the preset durations of time following the first group are equal to one another, and the preset durations of time of the first group are different from the preset durations of time of the second group.

10. The method of claim 9, wherein the amount of lubricating oil conveyed from the oil pump to the transmission components is a desired amount and is conveyed intermittently.

11. The method of claim 9, wherein the step of providing the input voltage to the drive unit includes repeatedly switching the drive unit on and off, and the step of driving the oil pump includes repeatedly switching the oil pump on and off.

12. The method of claim 9, including adjusting the input voltage provided to the drive unit during the preset durations of time to adjust the amount lubricating oil conveyed to the transmission components.

13. The method of claim 9, including adjusting the length of the preset durations of time during which the input voltage is provided to the drive unit.

14. The method of claim 9, including obtaining parameters relevant to operation of the transmission components and adjusting the input voltage provided to the drive unit based on the parameters.

15. The method of claim 9, wherein a plurality of the preset durations of time during which the input voltage is provided to the drive unit are equal to one another.

16. The method of claim 9, wherein the transmission components include a plurality of gears and a clutch with discs.

17. The method of claim 9, wherein the preset durations of time during which the input voltage is provided to the drive unit follow one another and repeat continuously.

18. The method of claim 9, wherein the preset durations of time together equal a total duration of time, the input voltage provided to the drive unit during the total duration of time causes the amount of lubricating oil conveyed by the oil pump to equal a preset desired amount, and wherein the input voltage provided to the drive unit during the total duration of time is less than the minimum voltage required to start the drive unit and the oil pump when the input voltage is provided to the drive unit continuously over the total duration of time without the intervals.

19. A system for lubricating a transmission of a motor vehicle, comprising:
   a plurality of transmission components;
   an oil pump conveying an amount of lubricating oil to said transmission components;
   a drive unit receiving an input voltage and using the input voltage to drive said oil pump, wherein the input voltage is received by said drive unit during preset durations of time and no voltage is received by said drive unit during intervals between the preset durations of time,
   the input voltage received by said drive unit during each preset duration of time is greater than a minimum voltage required to start said drive unit and said oil pump,
   the amount of lubricating oil conveyed by said oil pump to said transmission components is proportional to the input voltage received by said drive unit, and
   wherein the preset durations of time together equal a total duration of time, the input voltage received by said drive unit during the total duration of time causes the amount of lubricating oil conveyed by said oil pump to equal a preset desired amount, and wherein the input voltage received by said drive unit during the total duration of time is less than the minimum voltage required to start said drive unit and said oil pump when the input voltage is received by said drive unit continuously over the total duration of time without the intervals.

* * * * *